W. M. WARD.
SHOCK ABSORBER.
APPLICATION FILED MAY 10, 1913.
1,095,610.
Patented May 5, 1914.
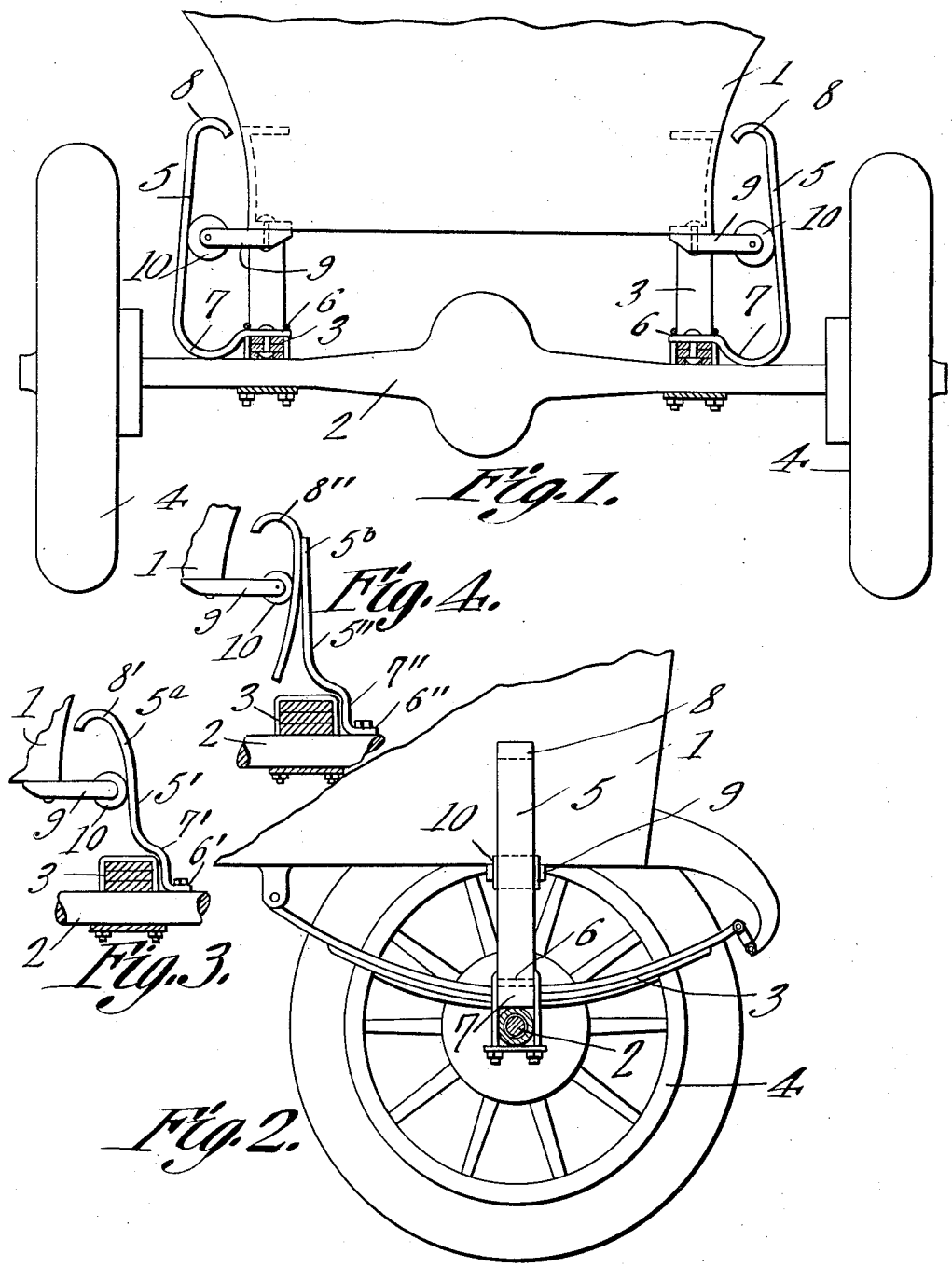

UNITED STATES PATENT OFFICE.

WILLIAM M. WARD, OF ROMEO, MICHIGAN, ASSIGNOR OF ONE-HALF TO ELMER O. MILLAY, OF ROMEO, MICHIGAN.

SHOCK-ABSORBER.

1,095,610.  Specification of Letters Patent.  Patented May 5, 1914.

Application filed May 10, 1913. Serial No. 766,882.

*To all whom it may concern:*

Be it known that I, WILLIAM M. WARD, a citizen of the United States, residing at Romeo, in the county of Macomb and State of Michigan, have invented a new and useful Shock-Absorber, of which the following is a specification.

The present invention appertains to shock absorbers, and aims to provide a novel and improved device of that character applicable to automobiles, buggies and other vehicles.

It is the object of the present invention to provide a device of the nature indicated of the utmost simplicity, durability and inexpensiveness, which will operate to effectively reduce the jolting of the vehicle body to a minimum.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention can be made within the scope of what is claimed without departing from the spirit of the invention.

The invention has been illustrated in its preferred embodiment in the accompanying drawing, wherein:—

Figure 1 is a fragmental rear view of an automobile embodying the present shock absorber. Fig. 2 is a fragmental side elevation. Fig. 3 is a detail view illustrating a modification. Fig. 4 is a view similar to Fig. 3 illustrating another variation.

In the drawing, the vehicle body, the vehicle as illustrated being an automobile, although it is understood that the present invention is applicable to various vehicles, has been designated by the numeral 1, and the rear axle has been designated by the numeral 2, it being further understood that the shock absorber may be applied to both the front and rear axles. In practice, the vehicle body is yieldably or resiliently supported upon the axle 2 by means of the semi-elliptical springs 3, or any other type of spring. The axle 2 also carries the traction wheels 4, as usual.

In carrying out the invention, there is provided a pair of vertical leaf springs 5, which are disposed at the sides of the body, and which project upwardly from the axle adjoining the wheels. The lower or butt ends of the springs 5 are preferably secured on those portions of the body supporting springs 3 secured on the axle, and designated at 6, and the springs 5 are preferably bent, as at 7, to contact with the axle proper, so as to somewhat brace the upright portions of the springs 5. The springs 5 are inclined inwardly or toward the body, or may be said to converge upwardly from the axle between the wheels and the vehicle body, the upper ends of the leaf springs 5 being bent inwardly into hooks 8.

Brackets 9 are secured to the vehicle body at its respective sides and above the axle, the brackets 9 being preferably secured to the bottom of the vehicle body or to the chassis so as to project outwardly toward the springs 5. To the outer or free ends of the brackets or arms 9 are journaled the wheels or rollers 10, which contact with the inner sides of the springs 5.

At this point, it may be mentioned, that the springs 5 and the spring engaging members may be attached to the axle and vehicle body in any suitable manner, either directly or indirectly, or it may even be possible to reverse the positions of the springs and spring engaging members. However, the arrangement as above described and as illustrated in the drawing, is a highly efficient one, and it is therefore desirable.

The springs 5 have a considerable tension inward or in opposition to each other so as to bear tightly and firmly against the rollers or bearings 10, so that it will be apparent that the tension of the springs somewhat retards the movements of the vehicle body relative to the axle, and will further prevent, to a certain extent, the vehicle body from pitching or swaying laterally or sidewise. As illustrated in Fig. 1 the parts are shown in their relative positions when the vehicle is at rest, and it will be manifest that should the recoil of the springs 3 tend to pitch the vehicle body upwardly to the detriment of the springs 3 and to the discomfort of the passengers, the rollers 10 in being carried upwardly with the vehicle body tend to spread or flex the springs 5 outwardly, thereby increasing their tension and consequently, steadily and firmly retarding or arresting the upward movement or pitching of the vehicle body. The hooks 8 serve to limit or stop the upward movement of the vehicle body relative to the axle, so that at no time will the body be thrown excessively upward, although, ordinarily, the tension of the springs 5 will prevent the vehicle body from being pitched upwardly to the limit. The springs 5 therefore serve to minimize the jolting and jarring of the vehicle body, which results from the traversing of rough roads, but in addition, it will be observed that the springs 5 prevent the lateral or sidewise pitching or swaying of the vehicle body, as well as modifying the vertical movements of the vehicle body. When the vehicle body is depressed toward the axle, the springs 5 will also serve to constrain the vehicle body to return to its normal position slowly and without jerking.

Attention is called to the fact that the converging leaf springs carried by the end portions of the axle at the sides of the body have tensions toward each other, or toward the body, and that the bearings carried by the sides of the body are disposed between and contact with the said springs to spread them when the body and axle move apart.

From the foregoing, taken in connection with the drawing, the advantages and capabilities of the present device will be apparent, it being noted that the objects have been carried out satisfactorily, and that the present device is a desirable one for the purposes for which it is designed.

In the modification illustrated in Fig. 3, the lower end 6' of the leaf spring 5' is attached directly to the axle 2, the spring 5' being offset, as at 7', to accommodate the spring 3 of the vehicle. The leaf spring 5' is provided with a hook 8', and is bent angularly as at 5ª, in order that the spring 5' may be brought under greater tension when the roller 10 engages the angular portion 5ª. In this manner, the tension of the spring is accelerated as the body of the vehicle is thrown upward.

In the variation illustrated in Fig. 4, the leaf spring 5" has its lower end 6" secured to the axle 2, and is offset, as at 7", to accommodate the spring 3 of the vehicle, a second or supplemental leaf spring 5ᵇ being attached intermediate its ends to the upper or free end of the main leaf spring 5", and being bowed to have their ends converge so that the upward and downward movement of the roller 10 will increase the tension of the spring 5". The upper or outer end of the supplemental or auxiliary leaf spring 5ᵇ is provided with the hook 8" for limiting the upward movement of the roller 10. This form of spring is desirable in that it increases the tension upon both the upward and downward movement of the vehicle body, it being understood, of course, that the parts illustrated in Fig. 4 are duplicated at the two sides of the vehicle as suggested in Fig. 1.

Having thus described the invention, what is claimed as new is:—

1. In combination with a vehicle body and axle, converging leaf springs carried by one of said parts and having tensions toward each other, supplemental bowed leaf springs secured to the aforesaid springs and having their ends converging, and bearings carried by the other part between and contacting with the supplemental springs to spread them when the body and axle move relative to each other.

2. In combination with a vehicle body and axle, converging leaf springs carried by the end portions of the axle at the sides of the body and having tensions toward each other, supplemental bowed leaf springs secured to the aforesaid springs and having their ends converging and bearings carried by and projecting from the sides of the body between and contacting with the supplemental springs to spread them when the axle and body move relative to each other.

3. In combination with the body and axle of a vehicle, outstanding arms carried by the sides of the body, rollers journaled to the free ends of the arms, and upstanding converging leaf springs carried by the axle and bearing inwardly against the respective rollers, the upper ends of the leaf springs being hooked inwardly.

4. In combination with a vehicle body and axle, converging leaf springs carried by one of the said parts, supplemental bowed leaf springs secured intermediate their ends to the aforesaid springs and having their ends converging, the outer ends of the supplemental springs being hooked, and bearings carried by the other part between and contacting with the supplemental springs.

5. In combination with a vehicle body and axle, converging leaf springs carried by the end portions of the axle at the sides of the body, supplemental bowed leaf springs secured intermediate their ends to the aforesaid springs and having their ends converging, the upper ends of the supplemental springs being hooked inwardly, and bearings carried by and projecting from the sides of the body between and contacting with the supplemental springs.

6. In combination with the body and axle of a vehicle, converging leaf springs carried by one of said parts and having their free ends formed with hooks, and bearing members carried by the other part and engaging the said springs, the hooks limiting the movement of the bearing members.

In testimony that I claim the foregoing as my own, I have hereto affixed my signature in the presence of two witnesses.

WILLIAM M. WARD.

Witnesses:
 HATTIE E. HOSNER,
 L. E. BEDELL.